O. HUSSEY.
Harvester Cutter.
No. 742. Reissued June 21, 1859.
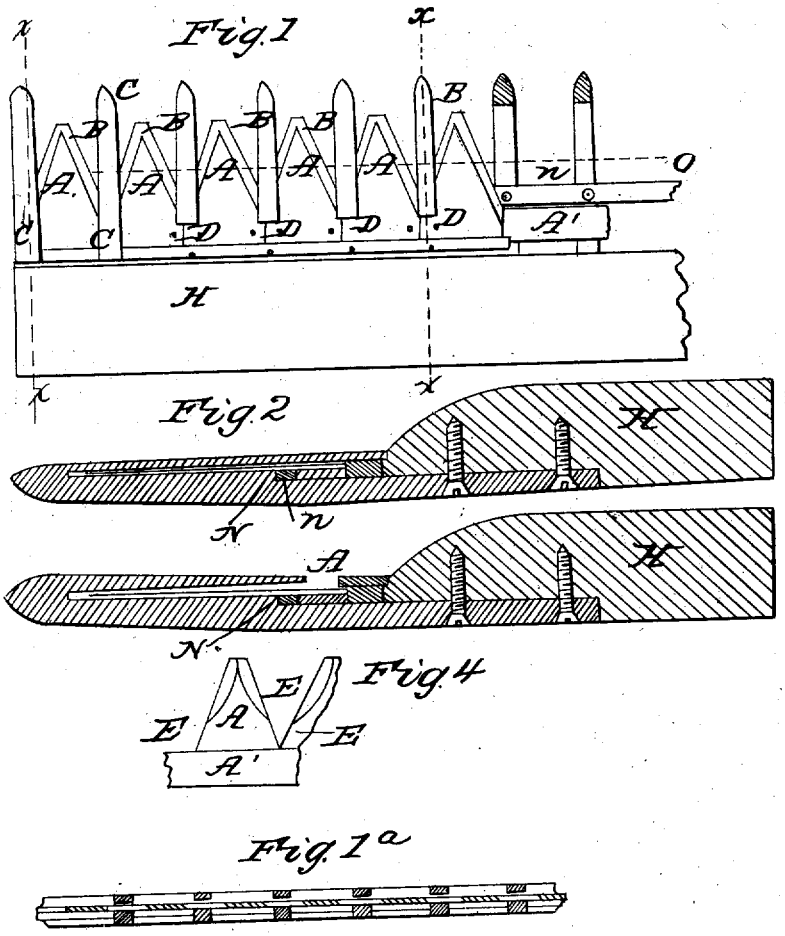
N. PETERS, Photo-Lithographer, Washington, D. C.

UNITED STATES PATENT OFFICE.

OBED HUSSEY, OF BALTIMORE, MARYLAND.

IMPROVEMENT IN REAPING-MACHINES.

Specification forming part of Letters Patent No. 5,227, dated August 7, 1847; Reissue No. 450, dated April 14, 1857; Reissue No. 742, dated June 21, 1859.

DIVISION A.

*To all whom it may concern:*

Be it known that I, OBED HUSSEY, of the city of Baltimore, in the county of Baltimore and State of Maryland, have invented a new and useful Improvement in the Reaping-Machine; and I do hereby declare that the following is a full, clear, and exact description of the construction and operation of the same, reference being had to the annexed drawings, making a part of this specification, in which—

Figure 1 represents a bird's-eye view of a part of the cutting apparatus of a reaping-machine, in which A A A A A A represent angular blades, and A′ A′ the stock of a vibrating sickle, the blades being riveted or otherwise secured to the stock, and so constructed and arranged that their cutting-edges form a zigzag or scalloped line, and one side of the blade only is beveled at and near the forks or re-entering angles of the zigzags, to sharpen the edge, which at these parts is thus left flush with the other side of the blade. B B B B B B represent permanent guard-irons. H represents a part of the finger-beam. The guards B are formed of a lower and an upper bar, so arranged as to admit the blade of the cutter to pass between them. The improvement claimed under this patent relates to only one of the bars of the guard—viz., the one against which the flush edge of the cutter works, and is irrespective of the other part. A scalloped cutter with a flush edge at the forks is found to be more effective in cutting grass than when the edge is formed by beveling both sides of the blade; but such a cutter does not work in all cases with the best effect when combined with a guard-finger having longitudinal side bearing only for supporting the stalks while being cut; and I have found in cutting small flexible and tough stalks of grass that bearings transverse to the sides of the fingers are important, among other things, to afford sufficient breadth of surface for the flush edge to cut on while using a narrow finger, and to prevent the stalks from getting too far back before being severed, which transverse or cross bearings produce the best effect when their sides next the blade are in the same plane with the corresponding side of the bar of the finger with which they are connected, so that the flush edge of the cutter may work in contact with both the longitudinal and cross-bearings of the guards. The transverse bearing I have formed of a bar, *n*, arranged across the fingers in front of the stock or bar to which the blades of the knife are riveted.

Fig. 1ª represents a vertical section at the line *o o*, Fig. 1, showing the flush edge of the cutter in contact with the top of one bar of the fingers and of the transverse bearings.

Fig. 2 represents a vertical section at the line *x x*, Fig. 1, showing a guard-finger with its slot closed both above and below the cutter, also the manner in which the transverse bearings are arranged in relation to the sides of the fingers and to the stock of the cutter.

Fig. 3 represents a similar section at the line ⁄⁄ ⁄⁄ of Fig. 1, the guard-finger having its slot open, as seen at A.

Fig. 4 represents a view of one of the blades A and a fragment of another, and of the stock A′, to which the blades are riveted, with the flush edge E E at each side of and at the forks of the blades. The rearward or retreating angles of the zigzag edge of the sickle I call the "forks" of the blades, and the forward or salient angles I call the "points" of the blades.

I claim as my invention—

The combination of side and cross bearings of the guards with flush edges at and near the forks of the blades, substantially as described.

In testimony whereof I have hereunto subscribed my name.

OBED HUSSEY.

Witnesses:
P. H. WATSON,
HENRY BALDWIN, Jr.